United States Patent [19]

Olson et al.

[11] Patent Number: 5,321,490
[45] Date of Patent: Jun. 14, 1994

[54] ACTIVE NEAR-FIELD OBJECT SENSOR AND METHOD EMPLOYING OBJECT CLASSIFICATION TECHNIQUES

[75] Inventors: Robert A. Olson, Orlando; Robert L. Gustavson, Winter Springs; Richard J. Wangler, Maitland; Robert E. McConnell, II, Longwood, all of Fla.

[73] Assignee: Schwartz Electro-Optics, Inc., Orlando, Fla.

[21] Appl. No.: 980,273

[22] Filed: Nov. 23, 1992

[51] Int. Cl.$^5$ ................................................ G01C 3/08
[52] U.S. Cl. ............................................ 356/5; 356/4
[58] Field of Search ..................................... 356/4, 5

[56] References Cited

U.S. PATENT DOCUMENTS

| | | |
|---|---|---|
| 3,167,739 | 1/1965 | Girard et al. |
| 3,436,540 | 4/1969 | Lamorlett |
| 3,516,056 | 6/1970 | Matthews |
| 3,532,886 | 10/1970 | Kruger |
| 3,605,082 | 9/1971 | Matthews |
| 3,644,917 | 2/1972 | Perlman |
| 3,680,047 | 7/1972 | Perlman |
| 3,719,938 | 3/1973 | Perlman |
| 3,852,592 | 12/1974 | Scoville et al. |
| 3,972,021 | 7/1976 | Leitz et al. |
| 4,317,117 | 2/1982 | Chasek |
| 4,433,328 | 2/1984 | Saphir et al. |
| 4,569,599 | 2/1986 | Bölkow et al. ............... 356/5 X |
| 4,699,507 | 10/1987 | Etoh ................................. 356/5 |
| 4,699,508 | 10/1987 | Bölkow et al. ................ 356/5 |
| 4,716,298 | 12/1987 | Etoh .............................. 356/5 X |
| 4,734,587 | 3/1988 | Schwarte ...................... 356/5 X |
| 4,888,477 | 12/1989 | Nankivil ....................... 356/5 X |
| 4,948,246 | 8/1990 | Shigematsu .................... 356/5 |
| 5,054,911 | 10/1991 | Ohishi et al. .................... 356/5 |
| 5,110,203 | 5/1992 | MacCabee ..................... 356/5 |
| 5,118,180 | 6/1992 | Wichmann ...................... 356/5 |
| 5,192,979 | 3/1993 | Grage et al. ................ 356/28.5 |

OTHER PUBLICATIONS

The Urban Transportation Monitor, Jun. 8, 1990 "Overhead Infrared Vehicle Detection".

Primary Examiner—Mark Hellner
Attorney, Agent, or Firm—Allen, Dyer, Doppelt, Franjola & Milbrath

[57] ABSTRACT

The sensor includes a range finder having means for emitting a directional output of pulsed energy toward a fixed area, and includes a transmitter section which divides pulsed energy into divergent beams, which are then received as reflective energy in a receiver section. The receiver alternately selects between outputs of two detectors receiving reflections from the beam and provide inputs for purposes of determining time of flight, and for measuring the time interval between interceptions of the two divergent beams for a given object. The sensor also receives inputs indicating the time that each pulse is emitted and the selected outputs from the detector to indicate when returning energy is received from the corresponding pulse to determine the elapsed time between the two.

31 Claims, 8 Drawing Sheets

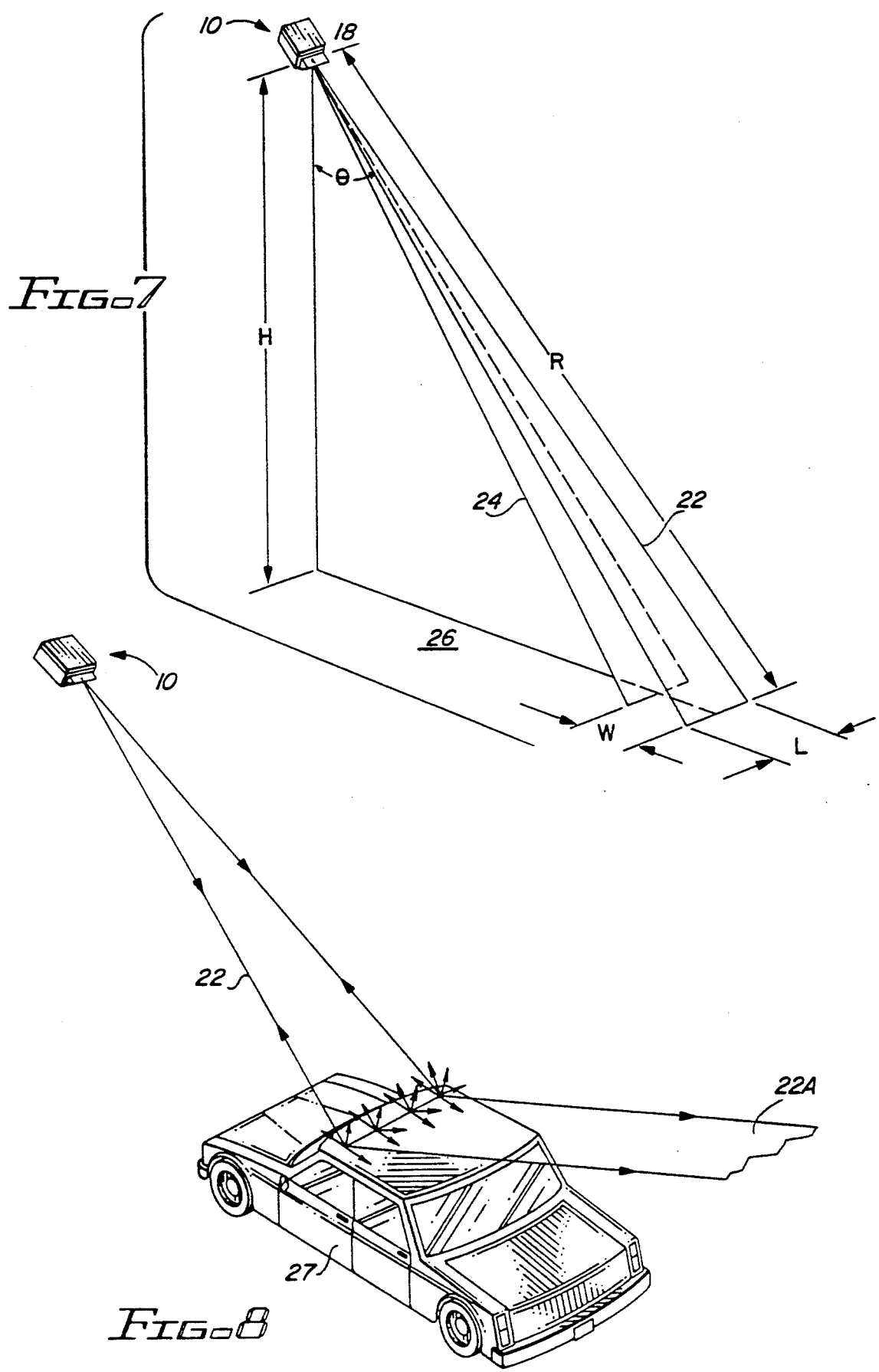

ACTIVE NEAR-FIELD OBJECT SENSOR AND METHOD EMPLOYING OBJECT CLASSIFICATION TECHNIQUES

The present invention relates generally to object sensors and related methods, and in particular relates to electronic object sensors and methods useful in detecting objects at a close range.

BACKGROUND OF THE INVENTION

There is a continuing demand for accurate, low-cost sensors useful in a wide variety of applications, including equipment used in the home, as well as for security, military and transportation applications. For example, in the transportation field, the most prevalent sensor used for controlling traffic signals is a simple inductive loop which is buried beneath the pavement. While inductive loop sensors have proven to be effective in traffic control applications, they must be replaced not only when the loop malfunctions but also when the roadway is being resurfaced or an excavation takes place. Under these circumstances, the cost of loop replacement is of a lesser concern than the resulting disruption in traffic.

There have been suggestions for traffic signal controllers utilizing overhead sensors. See for example, the following U.S. patents: No. 3,167,739 to Girard et al; No. 3,436,540 to Lamorlett; No. 3,516,056 to Matthews; No. 3,532,886 to Kruger et al; No. 3,680,047 to Perlman; and No. 4,317,117 to Chasek.

Near-field sensors have also been utilized as intruder alarms and as automatic door operators. Examples of such arrangements are disclosed in the following U.S. patents: No. 3,605,082 to Matthews; No. 3,644,917 to Perlman; No. 3,719,938 to Perlman; No. 3,852,592 to Scoville et al; No. 3,972,021 to Leitz et al; and No. 4,433,328 to Saphir et al.

SUMMARY OF INVENTION

The principal goals of this invention are to provide active near-field object sensors which are relatively low in cost, are accurate and have utility in a wide variety of applications. A brief summary of some of the important features of the invention is set out next. The ensuing description, claims and the accompanying drawings also disclose other important features as well.

The present invention contemplates a sensor for detecting the presence of an object within an area located in a close range to the sensor, and includes a range finder having means for emitting a directional output of pulsed energy toward the fixed area. In a preferred arrangement, the emitting means comprises a laser diode capable of emitting pulses of coherent infrared radiation, which are used together with collimating optics to provide two diverging output beams directed toward the near-field area under observation.

The sensor also includes means for receiving a portion of the energy reflected from either the area, or an object located within the area. The returned pulse energy is then provided as an input to a receiver for determining a time of flight change for pulses between the emitting and receiving means, which may be caused by the presence of an object within the area. The sensor is also provided with various features useful in providing outputs which indicate either the speed, census, size or shape of one or more objects in the area. For example, the sensor is provided with means for receiving an input from the time of flight determining means and for providing an output indicating whether the object meets one of a plurality of classification criteria (e.g., is the object an automobile, truck or motorcycle). The sensor also includes means for determining a timing error caused by amplitude variations in the returning reflected energy and providing a range correction responsive to that timing error determination.

To achieve these and other objectives, the receiving means includes two detectors, with means for alternately selecting between the outputs of the two detectors for providing inputs to the time of flight determining means; means are also provided for measuring the time interval between interceptions of the two diverging outputs by a given object, so as to calculate the speed of the object passing through the area.

Another feature of the present invention is the utilization of means for receiving inputs from the range finder indicating the time when each pulse of the output is emitted and for receiving inputs from a selected one of the detectors for indicating when returning energy is received from the corresponding pulse. An output is then generated representative of the elapsed times between the two inputs, and that output is utilized to determine whether an object is present between the sensor and the area being observed. In one particular arrangement, the elapsed time output generating means comprises a capacitor; a constant current source for charging the capacitor prior to receipt of an input from the emitting means; means for initiating discharge of the capacitor responsive to receipt of the emitting means input; and means for thereafter interrupting discharge to the capacitor upon receipt of an input from the detector. The elapsed time is then determined as a function of the remaining charge stored in the capacitor.

The sensor of the present invention is designed for use with a compact enclosure having an optically transmissive window, with means provided to heat the window to prevent fogging or ice formation. The sensor employs an electro-optic assembly including a transmitter section, a receiver section, a signal processing section and a power supply which together provide the various electronic and optical functions of the system.

THE DRAWINGS

FIGS. 7 and 8 are perspective views illustrating the operation of the sensor of the present invention.

DETAILED DESCRIPTION

Figure 1:
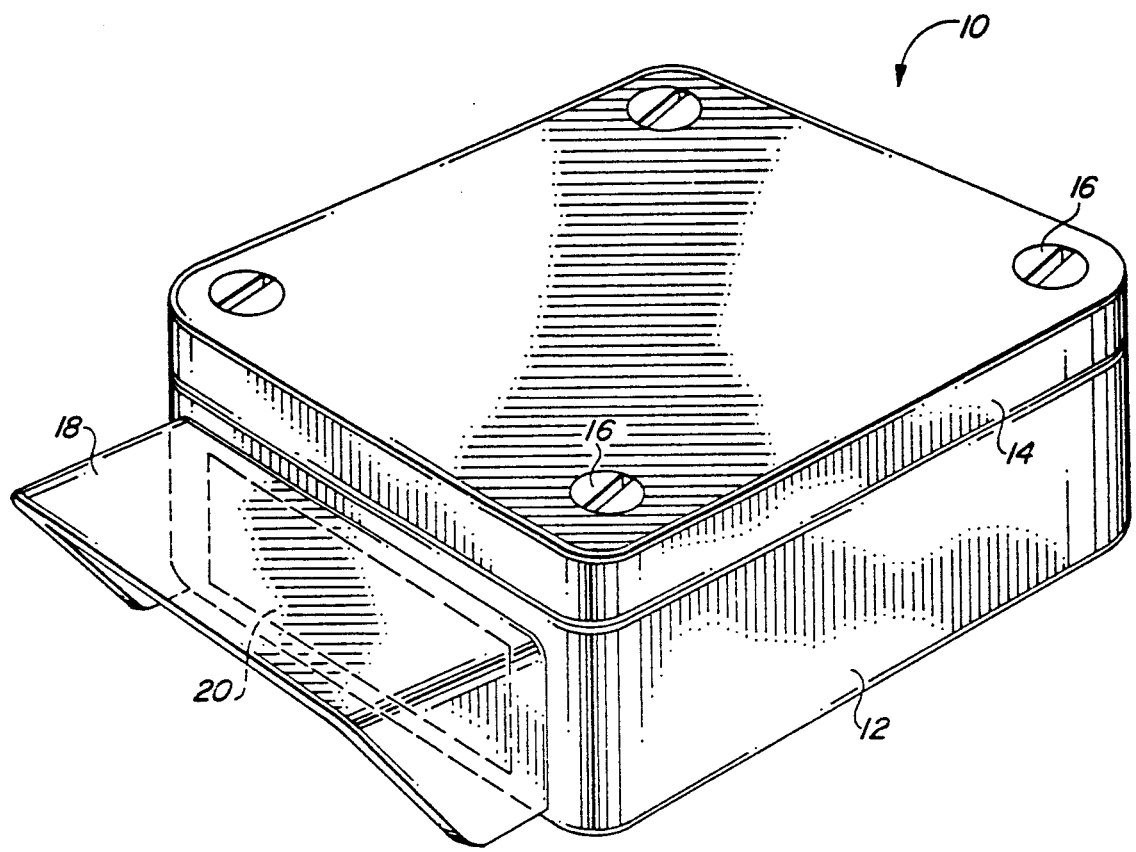
FIG. 1 is a perspective view illustrating a preferred embodiment of an enclosure useful with the sensor of the present invention.
Figure 2:
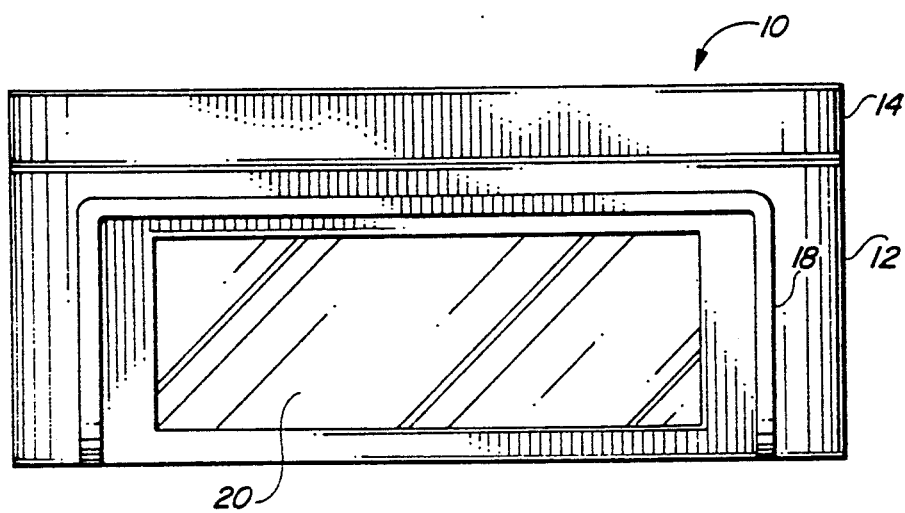
FIG. 2 is a front elevation of the enclosure shown in FIG. 1.

A detailed description of the components of the system and method of the present invention together with its operation is set out next with reference to the drawings, where like reference numerals among the drawings refer to a common element.

A. Hardware Description

1. Enclosure

A sensor in accordance with the present invention is referred to generally by the reference numeral 10 in FIG. 1, and employs a compact enclosure 12 of lightweight material, such as aluminum. The enclosure 12 has a cover 14 secured by fastener 16. Across one side of the enclosure 12 is a transmissive window 20, which is shielded from ambient weather by a hood 18.

2. Electronics and Optics

Figure 3:
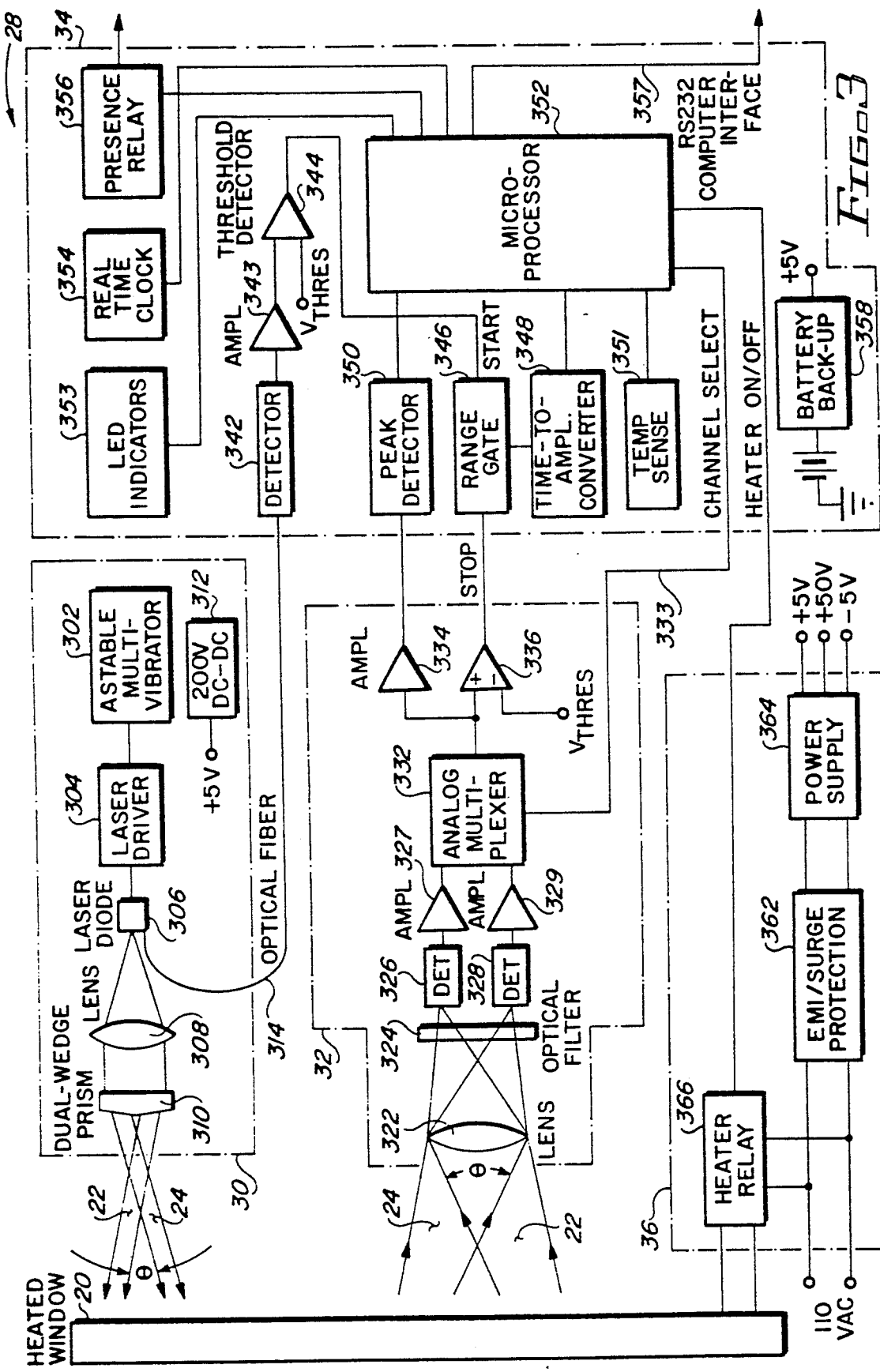
FIG. 3 is a block diagram illustrating the electronic and optics portions of the hardware used with the sensor of the present invention.

A preferred form of the electro-optical assembly fitted within the enclosure 12 is depicted in a schematic, block diagram format in FIG. 3 and referred to there generally by the reference numeral 28. The electrical-optical assembly includes a transmitter section 30, a receiver section 32, a range/processor section 34 and a power supply 36, each of which is discussed below.

a. Transmitter Section

The transmitter section 30 includes an astable multivibrator 303 generating a laser trigger pulse at a nominal repetition frequency of 3 kilohertz to a laser driver 304 which, by way of example, produces a 20 ampere peak current pulse with a 4 nanosecond rise time, and a ten nanosecond pulse width. The output of the laser driver controls a laser diode 306, which preferably comprises an indium gallium arsenide injection laser diode array having an output on the order of 180 watts, at the 20 ampere pulse current defined by the driver 304. This diode emits an output at 905 nanometers, which has been found to be an ideal wavelength for the silicon photodiode receiver, discussed below. It is also preferred that the array of the laser diode 306 have a junction characterized by dimensions of about 3.96 millimeters by 0.002 millimeters, in order to emit radiation in a 10 degree by 40 degree solid angle.

The output of the laser diode array 306 is collected by a fast (F/1.6) multi-element optical lens 308 which has an effective focal length of 24 millimeters and which is used to collimate the diode laser emission, the resulting collimated beam passes through a dual-wedge prism 310. By way of example, the resulting beam has a divergence of $\Theta \parallel = 3.96/24 = 165$ mrad parallel to the diode junction and $\Theta \perp = 0.002/24 = 0.083$ mrad perpendicular to the diode junction. The two outputs of the dual-wedge prism 310 are referred to by reference numerals 22 and 24. Both outputs are passed through the heated transmissive window 20.

In order to generate the high voltage necessary to pulse the laser diode 306, a 200 volt DC-DC converter 312 is provided in the transmitter section 30 and preferably is contained within an aluminum enclosure (not shown) to reduce electrical interference.

The transmitter section 30 further includes an optical fiber 314 coupled to receive a simultaneous output from the laser diode 306 with the emission into the lens 308. The output passing through the optical fiber 314 provides a significant aspect of the present invention, as is discussed in greater detail below with reference to the range/processor section 34.

b) Receiver Section

The receiver section 32 includes lens 322 for receiving reflected returning energy from the two pulsed output beams 22, 24 emitted by the transmitter section 30. The energy passing through the lens 322 is passed through an optical filter 324, and the single input from the lens 322-filter 324 is fed into two photodetectors 326, 328 each of which provides an input to a respective amplifier 327, 329 both of which provide an input to an analog multiplexer 332. It will thus be understood that the optical energy received in the lens 322 is first converted into an equivalent electronic analog of the input radiation and second into a logic-level signal. The outputs of the two photodetectors 326, 328 are time-multiplexed by the high-speed analog multiplexer 332, which is controlled by a logic-level control line 333 from the microprocessor 352 contained within the range/processor section 34. The output of the multiplexer 332 is connected to a threshold detector 336 and an amplifier 334, both of which provide inputs to the range/processor section, as described below.

Preferably, the two photodetectors 326, 328 are silicon photodiodes which operate as current sources, with the associated amplifiers 327, 329 converting the current pulses of the photo detectors 326, 328 into voltage pulses. Each amplifier 327, 329 offers a transimpedance of 28 kilohms when operated in a differential mode.

The optical filter 324 preferably has a narrowband (on the order of 40 nanometers) width, which limits the solar irradiance and permits only the 904 nanometer radiation to reach the photodetectors 326, 328. Typically, the transmission of the narrow-band filter 324 is on the order of about 75 percent at 904 nanometers.

Although not shown, it is preferred that the analog portion of the receiver section 32 be contained within a faraday shield which permits the circuit to operate in a "field-free" region where the gain is achieved without additional noise reduction.

c) Range/Processor Section

The range/processor section 34 includes a detector 342 optically coupled with the fiber 314, an amplifier 343 and a threshold detector 344, the output of which represents a "start" input to a range gate 346. The "stop" input for the range gate 346 is provided as the output from the threshold detector 336 contained within the receiver section 32.

While it will be appreciated by those skilled in the art that both digital and analog techniques may be used for making the time interval measurement in order to accurately measure the propagation time of the laser pulse to the target and back to the receiver, the analog technique has been chosen in the present invention because of its better resolution, smaller size, simpler circuitry, lower power consumption and lower costs when compared with the digital technique. The analog range measurement technique specifically used in the present invention is known as a "time-to-amplitude converter" and has an accuracy of about one percent of measured range and a resolution of about plus or minus 5 centimeters.

The specific forms of the range gate 346 and the time-to-amplitude (TAC) converter circuit 348 are shown in FIG. and use a constant-current source including transistor Q1 to charge a ramp capacitor C38 to obtain a linear voltage ramp whose instantaneous value is a measure of elapsed time. The TAC circuit is designed so that the voltage across the capacitor C38 begins ramping down from the positive power supply when the laser diode 306 fires. The ramp is stopped when either a reflected pulse is received at the detectors 326, 328 or at the end of a measured period of time. The output 349 of the TAC converter 348 is then converted to a digital format by an 8 bit analog-to-digital converter inside the microprocessor 352 (FIG. 3). The start timing pulse for the TAC converter 348 is produced utilizing the optical detection of the transmitted laser pulse through the fiber 314, which provides an input to the detector 342 and thence to the amplifier 343.

As shown on the left hand side of the range/processor section 34 in FIG. 3, the output of the amplifier 334 from the receiver section 32 is provided as an input to a peak detector 350 which in turn provides an input to the microprocessor 352. This feature is directed to a major problem previously encountered when measuring range-to-vehicles in the low level of return signals from windshield and poorly reflecting black metal or plastic vehicle parts. This low level of return signals frequently results in range readings which are close to those from the street level, and would therefore erroneously indicate that a vehicle was not present. This range measurement error, which is proportional to the magnitude of the variation in return-signal level, is known as "timing walk". This problem is solved by the accurate measurement of the peak of the return signal with the high-speed peak detector circuit 350, and the use of the microprocessor 352 to apply a correction factor to the range measurement based on the return signal level. Thus, a very low level of the signal is in itself an indication of the presence of an object (such as a vehicle) being detected. The sensor will then indicate the presence of the object when either the range reading is shorter than that to the street, or alternatively when the return-signal level is much less than that from the street.

In one specific arrangement, the microprocessor 352 comprises an Intel 87C196KC into which the software described below is loaded. As noted in range/processor section 34 in FIG. 3, the microprocessor 352 provides various outputs to light emitting diode indicators 353, a presence relay 356 for indicating the presence of an object, an RS 232 computer interface 357 and to a heater relay 366 contained within the power supply 36, described below. The microprocessor 352 receives additional inputs from a temperature sensor 351 and a real time clock 354. The range/processor section 334 preferably also includes a battery backup circuit 358.

d) Power Supply Section

The power supply section 36 includes an EMI/surge protection circuit 362 for a power supply 364 operated by 110 volt line current. The power supply circuit includes a heater relay 366 controlled by the microprocessor 352, as discussed above, and receiving 110 volts line power. The heater relay is coupled to the window 20, to maintain the temperature of the window 20 constant for varying ambient conditions.

B. Software Description

Figure 4:
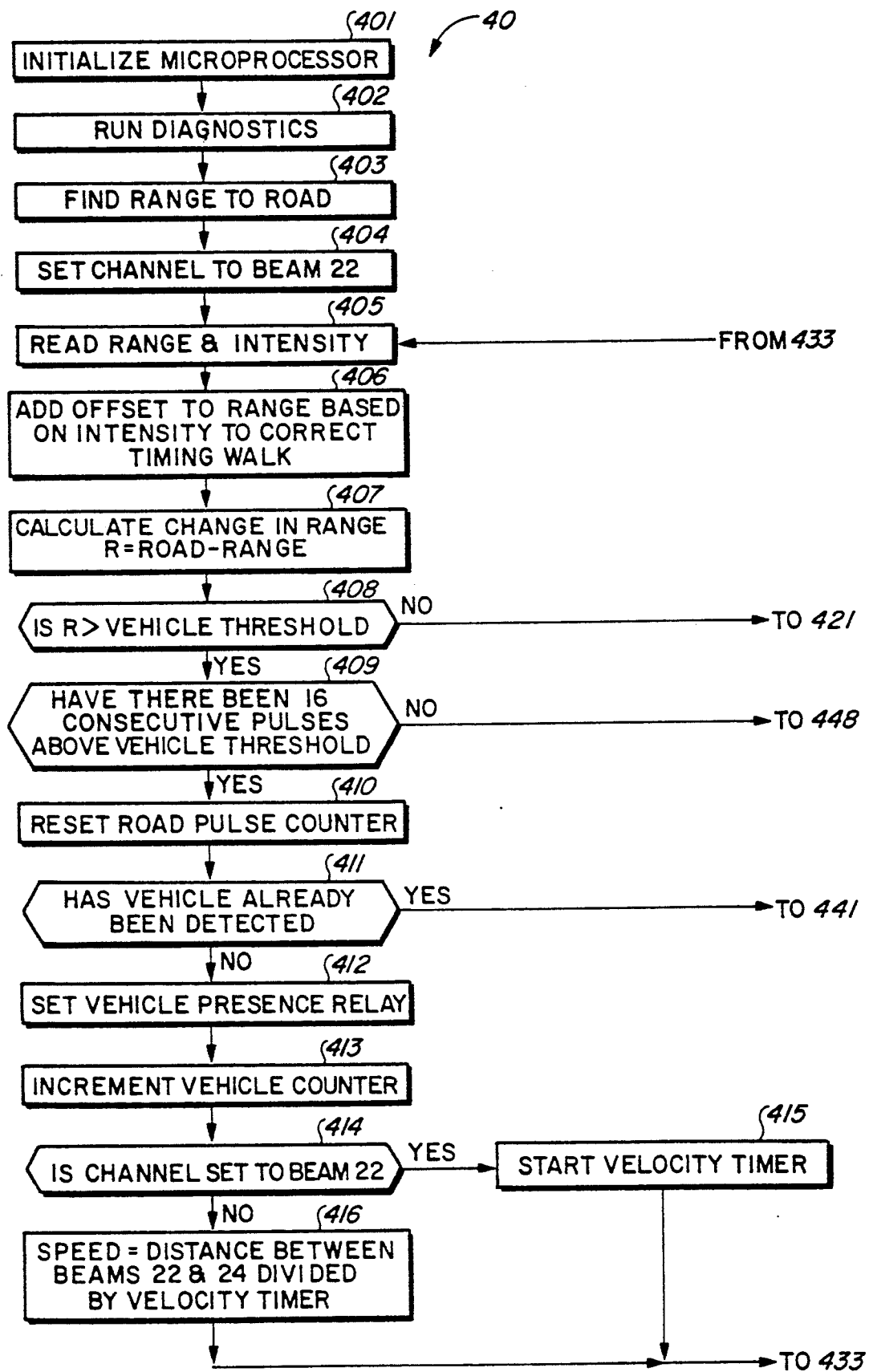
FIGS. 4, 5 and 6 are interrelated flow charts illustrating a preferred embodiment of the software useful with the present invention.
Figure 5:
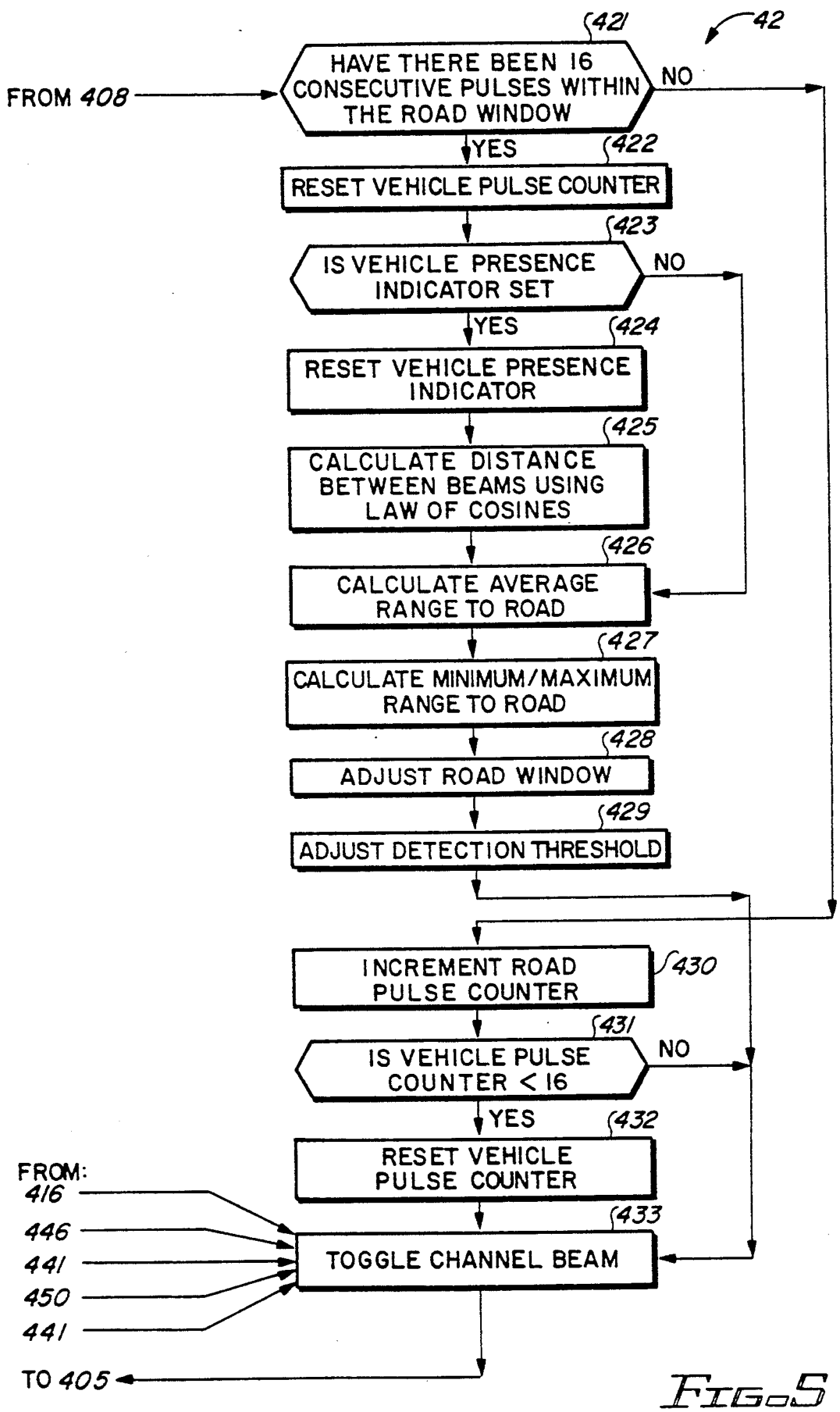
Figure 6:
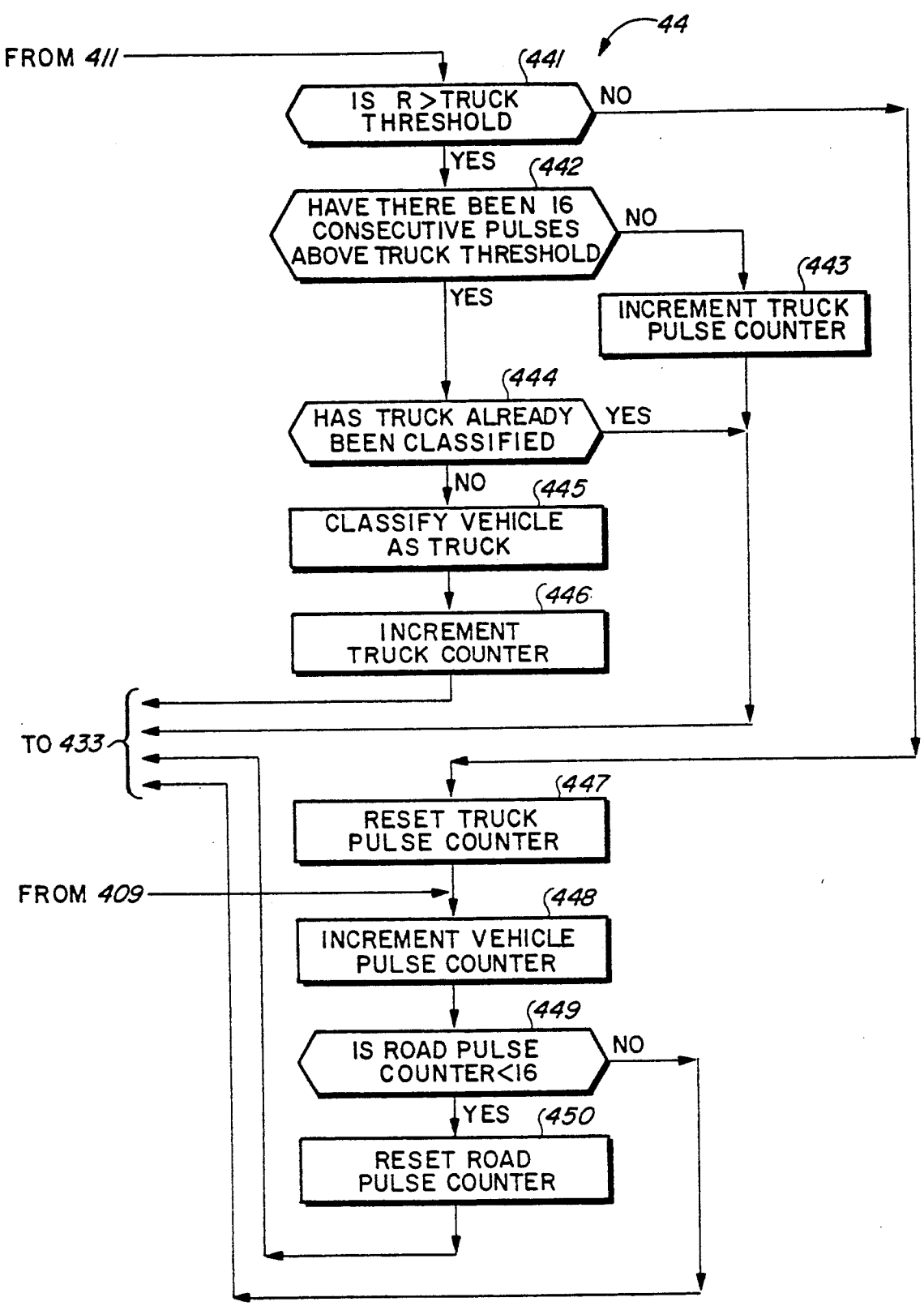

A preferred embodiment of the software useful in connection with the sensor system and method of the present invention is illustrated in flow chart form in FIGS. 4-6, with the portions of the software depicted in each of those figures being arbitrarily designated by reference numerals 40, 42 and 44 respectively. It will of course be understood that the software is loaded in an object code format into the microprocessor 352, and is designed to control the electrical-optical assembly 28 of the sensor lo in order to detect the presence of objects and to provide certain desirable outputs representative of the object, including for example, the speed with which the object moves through the area being sensed, the size and shape of the object, its classification and perhaps other characteristics. In one specific form, the sensor 10 has utility as a vehicle sensor for mounting in an overhead configuration in order to detect the presence of vehicles passing through an area—such as a portion of a roadway at an intersection—to identify the presence of a vehicle, classify the vehicle as either an automobile, truck or motorcycle, count the number of vehicles passing through the intersection and calculate the speed of each vehicle and the flow rate of all of the vehicles. The software depicted in FIGS. 4-6 has been specifically configured for those purposes.

Referring first to FIG. 4, the software initializes the microprocessor at 401, is subjected to diagnostics at 402 and then operates the electrical-optical assembly 28 to find the range to the road at 403. The software then sets up the receiver to detect return beam 22, and the range and return-signal intensity is read; the range and intensity reading is then toggled between the two beams 22, 24 as controlled by section 433 in FIG. 5 (note input to the right of block of 405 in FIG. 4).

Following the reading of the range and intensity from each of the two beams 22, 24, any necessary offset is added to the range based on the intensity to correct timing walk as depicted at step 406. The change in the range (i.e., the road distance minus the distance to any object detected) is calculated in step 407. If the resulting calculation is greater than the vehicle threshold as determined by step 408, then a vehicle pulse counter is tested at 409 to determine if there have been 16 consecutive pulses above the vehicle threshold; if the calculation at step 407 is less than the vehicle threshold, then another sequence of steps is initiated at 421 (FIG. 5) to reset the vehicle pulse counter at 432 and thereby toggle between the beams 22, 24 at step 433. As shown in FIG. 5, various resets and adjustments are made at steps 422-429, inclusive, including the calculation of the distance between the two beams at step 425 and the calculation of the average range to the road at 426 and the minimum/maximum range to the road at 427.

Referring again to FIG. 4, if the output of step 409 indicates that the number of consecutive pulses above the vehicle threshold is greater than 16, then the road pulse counter is reset at step 410. However, if the evaluation at step 409 is negative, then the vehicle pulse counter is incremented at step 448, and the road pulse counter is reset if it has previously incremented less than 16 times as indicated by steps 449 and 450; following this, the toggling between beams 22, 24 occurs at step 433.

Referring again to FIG. 4, if the road pulse counter is reset at step 410, then an inquiry is made as to whether the vehicle has already been detected; if the answer is affirmative, then an inquiry is made at step 441 to determine if the change in range determined at step 407 is greater than the truck threshold, as depicted at FIG. 6, in order to complete a truck-detection sequence at steps 442-446, inclusive. On the other hand, if the inquiry at step 411 (FIG. 4) is negative, then the vehicle presence relay is set at step 412, a vehicle pulse counter is incremented at 413 and a velocity timer is started at step 415 for purposes of determining the speed of the vehicle passing through the area being sensed.

Operation of the Sensor System

A description of the operation of the sensor system 10 and its associated electrical-optical assembly 28 in a vehicle-detection configuration will now be described with reference to FIGS. 7 and 8.

In FIG. 7, the sensor 10 is depicted as elevated to a height H above a roadway 26, and is displaced at an angle Θ so as to be pointed toward an area on the roadway 26 defined by the beam separation W and the beam length L, and which is located a range distance R between the sensor 10 and the area. In accordance with the discussion above with respect to the electrical-optical assembly 28, the sensor 10 transmits two separate beams 22, 24 which fall upon the area defined by the length L and the width W. As shown in FIG. 8, if a vehicle 27 is positioned across the roadway 26 at the area defined by the length L and the beam separation W, a portion of the radiated energy in beam 22 (for example) will be scattered away from the vehicle 27, while a portion is reflected back toward the sensor 10 for detection by receiver section 32, as described.

From the flow diagrams depicted in FIGS. 4-6, it will thus be understood that the microprocessor 352 using the software and the various inputs from the electrical-optical assembly first measures the range to the road; if the range falls below a predetermined threshold, the microprocessor signals that a vehicle is present by closing the presence relay 356. The threshold is determined by calculating the minimum, maximum and average range to the road for 100 discrete measurements. The maximum error is then calculated by subtracting the average from the maximum range measurement and the minimum from the average range measurement. The threshold is then set to the maximum error. The microprocessor 352 utilizing the software classifies the vehicle detected (as, for example, an automobile, a truck or a motorcycle) by examining the amount of range change, it being understood that a truck produces a much larger range change than an automobile, and a motorcycle a much smaller range change. The software keeps an accurate count of vehicles by classification for a predetermined period (for example, 24 hours) and in one example maintains a count of vehicle types for each hour of the day in order to provide a user flow rate.

The microprocessor 352 and the associated software also calculates the vehicle speed in the manner described above, by calculating the time each vehicle takes to pass between the two beams 22, 24. Specifically, the microprocessor 352 utilizes a microsecond time increment, and is reset to zero when the first beam 22 detects the presence of a vehicle, and is read when the vehicle is detected by the second beam. The software then automatically calculates the distance between the two beams 22, 24 by applying the law of cosines to the triangle formed by the two beams and the distance between them at the level of the roadway 26 in FIG. 7. The speed is then calculated by taking the distance between the beams and dividing it by the time the vehicle takes to travel that distance.

The sensor 10 can also be utilized to ascertain the existence of poor highway visibility conditions, which is useful in providing a warning to drivers to slow down because of dangerous visibility conditions. The amplitude of the return signal received by the vehicle sensor is proportional to the atmospheric transmittance (visibility). Analysis has shown that the sensor can detect vehicles until heavy fog or rainfall reduces the visibility range to 18 m. Corresponding to the change in visibility from clear day to foggy conditions, the received signal power decreased by a factor of 22. Thus, a measurement of the return-signal amplitude can be used to ascertain the existence of poor highway visibility conditions. If the microprocessor 352 senses a return-signal level from the roadway below a certain preselected threshold, then the software can initiate an output through the interface 357 to an appropriate visibility warning signal.

C. System Performance

Figure 9A:
FIG. 9A is a side view illustrating an automobile of the type which may be sensed by the present invention.
Figure 9B:
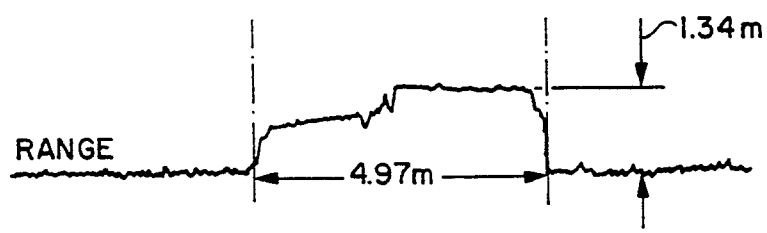
FIGS. 9B and 9C are graphic representations of outputs actually provided by the sensor of the present invention relative to an automobile like that shown in FIG. 9A.
Figure 9C:
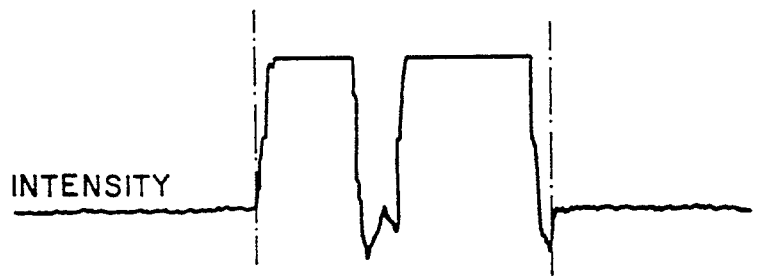
Figure 10A:
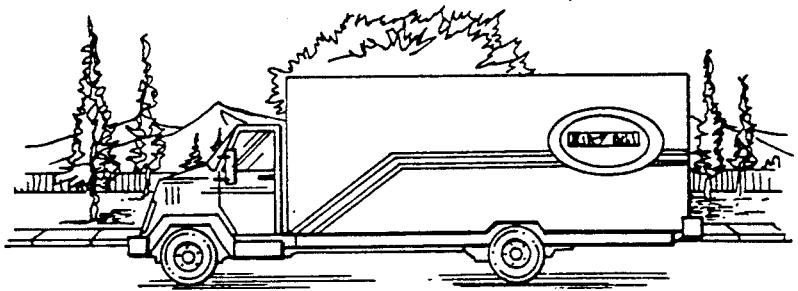
FIG. 10A is a side view illustrating a truck of the type which may be sensed by the present invention.
Figure 10B:
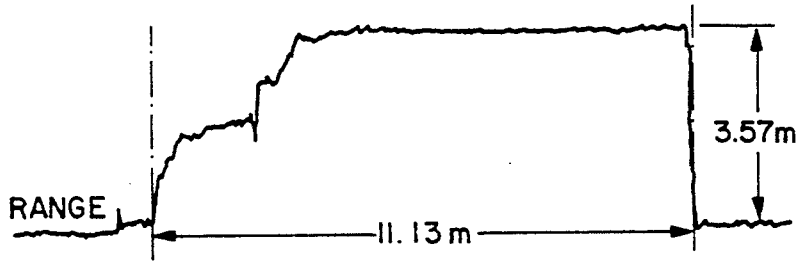
FIGS. 10B and 10C are graphic representations of outputs actually provided by the sensor of the present invention relative to a truck like that shown in FIG. 10A.
Figure 10C:
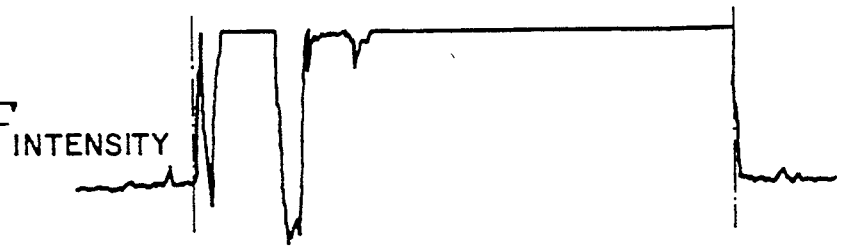
Figure 11:
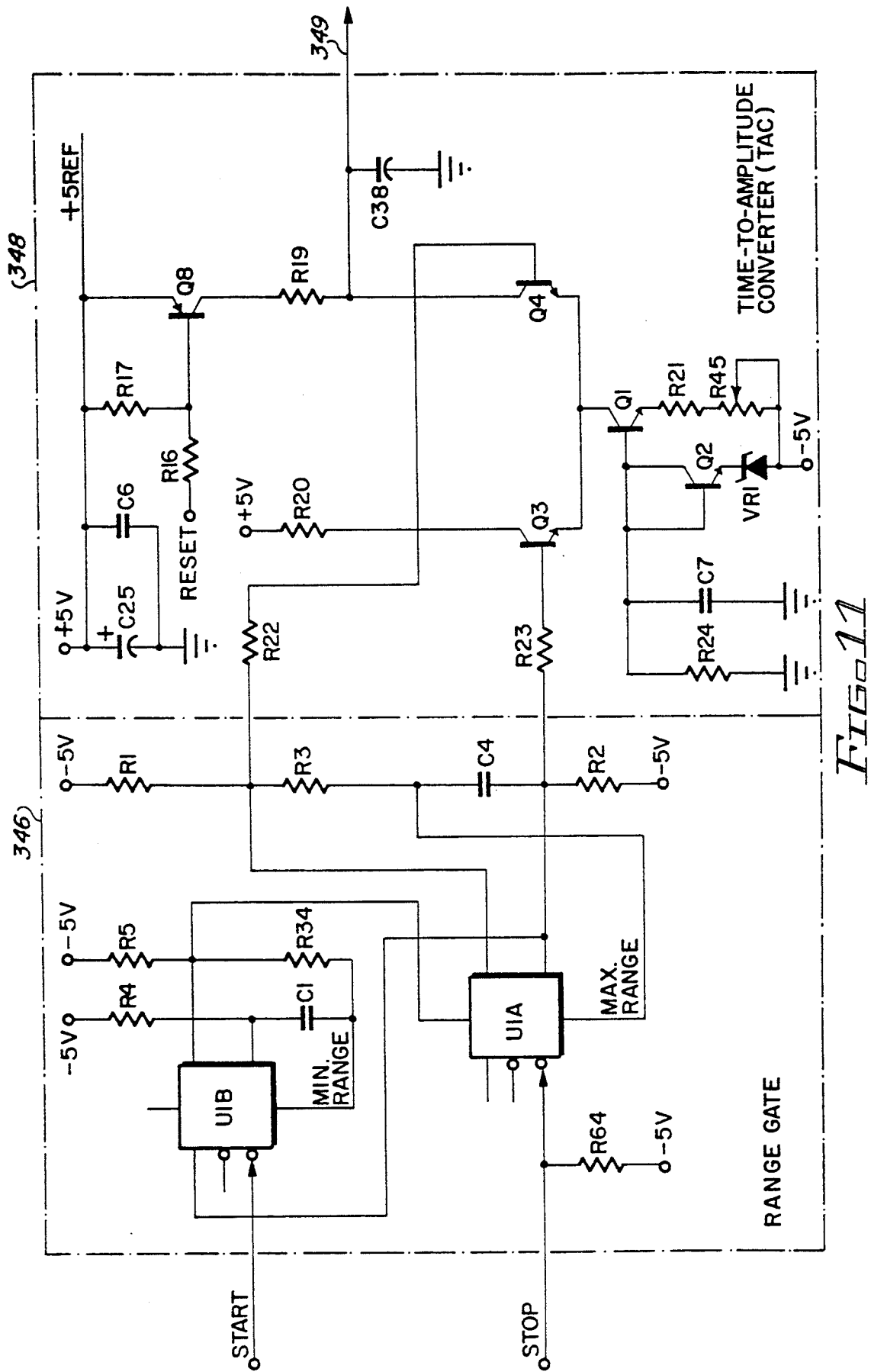
FIG. 11 is a schematic diagram of the time-to-amplitude circuit used in the present invention.

In tests conducted during May-August, 1992, a system according to the present invention was utilized as an overhead vehicle sensor on a roadway in Orange County, Fla. The sensor achieved a detection percentage of 99.4%, and measured speed with an accuracy equal to or greater than that of conventional radar guns used for traffic enforcement purposes. The system also provided vehicle range and intensity profiles, two examples of which are depicted in FIGS. 9A-C and 10A-C. In FIG. 9A, the vehicle in question was a station wagon, and the range measurements for which are depicted at FIG. 9B, with the intensity measurements being depicted at FIG. 9C. Similarly, the corresponding results of the range and intensity measurements for a truck shown at FIG. 10A are depicted at FIGS. 10B and C, respectively. It was observed that the vehicles were accurately filed, even in the area of the windshields where the intensity of the return signal was quite low, demonstrating the efficacy of the intensity-dependent range correction in mitigating the effect of timing walk on range measurements at low return-pulse amplitudes.

This concludes the description of the preferred embodiments. A reading by those skilled in the art will bring to mind various changes without departing from the spirit and scope of the invention. It is intended, however, that the invention only be limited by the following appended claims.

What is claimed is:

1. A sensor means for detecting the presence of an object within an area located at a close range, the sensor comprising:
   means for emitting an output of pulsed, coherent radiation toward a fixed area a known distance from the emitting means;
   means for receiving a portion of the returning pulsed energy reflected from the area;
   means for determining a time of flight change for pulses between the emitting and receiving means caused by the presence of an object in the area;
   means for receiving an input from the time of flight determining means and for providing an output indicating whether the object meets one of a plurality of classification criteria; and
   means for determining a timing error caused by amplitude variations in the returning reflected energy and providing a range correction responsive thereto.

2. A sensor means for detecting the presence of an object within an area located at a close range, the sensor comprising:
means for emitting an output of pulsed, coherent radiation toward a fixed area a known distance from the emitting means;
means for receiving a portion of the returning pulsed energy reflected from the area;
means for determining a time of flight change for pulses between the emitting and receiving means caused by the presence of an object in the area;
means for receiving an input from the time of flight determining means and for providing an output indicating whether the object meets one of a plurality of classification criteria; and
means for dividing the pulsed energy output of the emitting means into two diverging directional beams.

3. A sensor means for detecting the presence of an object within an area located at a close range, the sensor comprising:
means for emitting an output of pulsed, coherent radiation toward a fixed area a known distance from the emitting means;
means for receiving a portion of the returning pulsed energy reflected from the area;
means for determining a time of flight change for pulses between the emitting and receiving means caused by the presence of an object in the area;
means for receiving an input from the time of flight determining means and for providing an output indicating whether the object meets one of a plurality of classification criteria; and
means for alternately selecting between outputs of the two detectors for providing an input to the time of flight determining means.

4. A sensor for detecting the presence of a vehicle within close range and suitable for controlling traffic signals or measuring traffic speed, census or flow, the sensor comprising:
means for emitting a directional output of pulsed energy toward a fixed area a known distance from the emitting means;
means for receiving a portion of returning pulsed energy reflected from the area;
means for determining a time-of-flight change for pulses between the emitting and receiving means caused by the presence of a vehicle in the area; and
means including a peak return signal level detector for determining a timing error caused by amplitude variations in the returning reflected energy and providing a range correction responsive thereto.

5. The sensor recited in claim 4 wherein the timing error determining means comprises means for forming a logic-level output representative of the time-of-flight of each pulse.

6. The sensor recited in claim 4 wherein the emitting means comprises means for emitting pulses of coherent infrared radiation.

7. The sensor recited in claim 6 wherein the means for emitting pulses of coherent infrared radiation comprises a laser diode.

8. The sensor recited in claim 7 wherein the laser diode comprises a junction diode, further comprising means for collimating the output of the laser diode.

9. The sensor recited in claim 4 further comprising means for dividing the pulses of the emitting means into two diverging directional beams.

10. The sensor recited in claim 9 wherein the receiving means comprises two detectors, the sensor further comprising means for alternately selecting between outputs of the two detectors for providing inputs to the time-of-flight determining means.

11. The sensor recited in claim 9 further comprising means for measuring the time interval between intersections of the two diverging beams by a given vehicle, and calculating the speed of the vehicle.

12. The sensor recited in claim 4 further comprising means for providing an indication of the presence of a vehicle either as an output from the time-of-flight determining means or as an output from the peak return signal level detector.

13. A sensor, comprising:
means for emitting a pulse of coherent infrared radiation;
means for dividing the pulse into two diverging directional beams and directing the two beams toward an area which is a distance from the sensor;
two detectors, each receiving returning energy from reflections of the two beams;
means for receiving a signal from the emitting means indicating that a pulse has been emitted and for receiving an input from a selected one of the detectors for indicating when returning energy is received from the corresponding beams, and for then generating an output representative of the elapsed time between the signal and the input; and
means for receiving and determining from the elapsed time output whether an object is present between the sensor and the area.

14. The sensor recited in claim 13 wherein the emitting means comprises a laser junction diode.

15. The sensor recited in claim 13 wherein the dividing means comprises a prism for receiving the pulse from the emitting means and dividing the pulse into the two diverging beams at a predetermined angle.

16. The sensor recited in claim 15 further comprising lens means for focusing the returning energy within the predetermined angle into the two detectors.

17. The sensor recited in claim 16 further comprising an optical filter for restricting ambient light from the detectors.

18. The sensor recited in claim 16 further comprising a collimating lens between the emitting means and the prism.

19. The sensor recited in claim 13 wherein the elapsed time output generating means comprises:
a capacitor;
a constant current source for charging the capacitor prior to receipt of the emitting means signal;
means for initiating discharge of the capacitor responsive to receipt of the emitting means signal and for interrupting discharge of the capacitor upon receipt of the detector input; and
means for determining the elapsed time as a function of the remaining charge stored in the capacitor.

20. The sensor recited in claim 13 further comprising:
an optical fiber coupled to receive a portion of the pulse of coherent radiation; and
a photodiode coupled between the optical fiber and to the means for receiving the emitting means input.

21. The sensor recited in claim 20 further comprising a threshold detector interposed between the photo diode and the emitting means input for initiating the emitting means input only when an output of the photodiode is above a predetermined level.

22. The sensor recited in claim 13 further comprising means for measuring a signal level for reflections of the beams received in the detectors, and providing an indication of the presence of a vehicle when the signal level is below a predetermined threshold.

23. The system recited in claim 2 wherein the signal level measuring means is a peak detector.

24. A sensor for providing outputs useful in detecting objects and for measuring object size, census or speed, the sensor comprising:
 a compact enclosure having an optically transmissive window;
 a transmitter section, a receiver section, a signal processing section and a power supply;
 the transmitter section having:
  a laser diode for emitting coherent infrared radiation through the windows,
  means for alternately energizing the diode for a predetermined time and at a predetermined rate so that the diode emits pulses of coherent radiation having a known pulse width and repetition rate, and
  a prism between the diode and the window for dividing the pulsed output of the laser diode into two diverging directional beams at a predetermined angle through the window;
 the receiver section having:
  two photo detectors for receiving returning pulsed energy from one of the two transmitter beams and providing inputs representative of the time when the returned energy for each beam is received and a signal level for the returned energy of each beam,
  an optical filter between the window and the photo detectors for restricting ambient light from the detectors, and a focusing lens between the window and the photo detectors for focusing incident returning pulsed energy for the beams within the predetermined angle into the two photo detectors; and
 the signal processing section having:
  means for receiving an input from the transmitter section indicating the time that each pulse is emitted,
  means for receiving the inputs from the receiver section representative of the time when returned energy for each beam is received and the signal level for the returned energy of each beam, and
  means for generating an output representative of the elapsed time between the transmitter section input and the returned energy time input from the receiver section, and means for providing an output indicating the presence of an object dependent upon either an elapsed time determination indicating the presence of an object, or a signal level input from the receiver section below a predetermined threshold.

25. The sensor recited in claim 24 wherein the enclosure is a non-ferrous material.

26. The sensor recited in claim 24 wherein the power supply comprises means for heating the window.

27. The sensor recited in claim 24 wherein the processing section further comprises:
 a capacitor;
 a constant current source for charging the capacitor prior to receipt of the transmitter input;
 means for initiating discharge of the capacitor responsive to receipt of the transmitter section input and for interrupting discharge of the capacitor upon receipt of the returned energy time input from the receiver section; and
 means for determining the elapsed time as a function of the remaining charge stored in the capacitor.

28. A method for providing outputs representative of the presence of a vehicle within a close range and suitable for controlling traffic signals or measuring traffic speed, flow or census, the method comprising the steps of:
 emitting a directional output of pulsed energy toward a fixed area which is a known distance away;
 receiving a portion of returning pulsed energy reflected from the area;
 determining time-of-flight changes between the emitting and receiving steps caused by the presence of a vehicle located in the area; and
 detecting a peak return signal level and a timing error caused by amplitude variations in the returning pulsed energy.

29. The method recited in claim 28 further comprising the step of dividing the pulsed energy output into two diverging directional outputs.

30. The method recited in claim 29 further comprising the step of indicating the presence of a vehicle either as an output from the time-of-flight determining step or as an output from the peak return signal level detecting step.

31. The sensor recited in claims 1, 2, 3, 4, 13, or 24 further comprising means for initiating a visibility warning output if the returning pulse energy is below a predetermined threshold
 emitting a directional output of pulsed energy from the emitting means toward a fixed area a known distance from the emitting means;
 receiving a portion of the returning pulsed energy reflected from one of the area or an atmospheric condition between the area and the emitting means;
 determining a time-of-flight change for pulses between the emitting and receiving means caused by the presence of an atmospheric condition between the area and the emitting means; and
 determining a timing error caused by amplitude variations in the returning reflected energy and providing a range correction responsive thereto.

* * * * *

UNITED STATES PATENT AND TRADEMARK OFFICE
CERTIFICATE OF CORRECTION

PATENT NO. : 5,321,490
DATED : June 14, 1994
INVENTOR(S) : Robert A. Olson et al.

It is certified that error appears in the above-identified patent and that said Letters Patent is hereby corrected as shown below:

Claim 31 column 12:

31. The sensor recited in claims 1, 2, 3, 4, 13 or 24 further comprising means for initiating a visibility warning output if the returning pulse energy is below a predetermined threshold.

[emitting a directional output of pulsed energy from the emitting means toward a fixed area a known distance from the emitting means;

receiving a portion of the returning pulsed energy reflected from one of the area or an atmospheric condition between the area and the emitting means;

determining a time-of-flight change for pulses between the emitting and receiving means caused by the presence of an atmospheric condition between the area and the emitting means; and

UNITED STATES PATENT AND TRADEMARK OFFICE
CERTIFICATE OF CORRECTION

PATENT NO. : 5,321,490
DATED : June 14, 1994
INVENTOR(S) : Robert A. Olson, et al.

It is certified that error appears in the above-indentified patent and that said Letters Patent is hereby corrected as shown below:

```
determining a timing error caused by amplitude    -
variations in the returning reflected energy
and providing a range correction responsive
thereto.]
```

Signed and Sealed this

Twenty-second Day of November, 1994

Attest:

BRUCE LEHMAN

*Attesting Officer*      *Commissioner of Patents and Trademarks*